Figure 4:
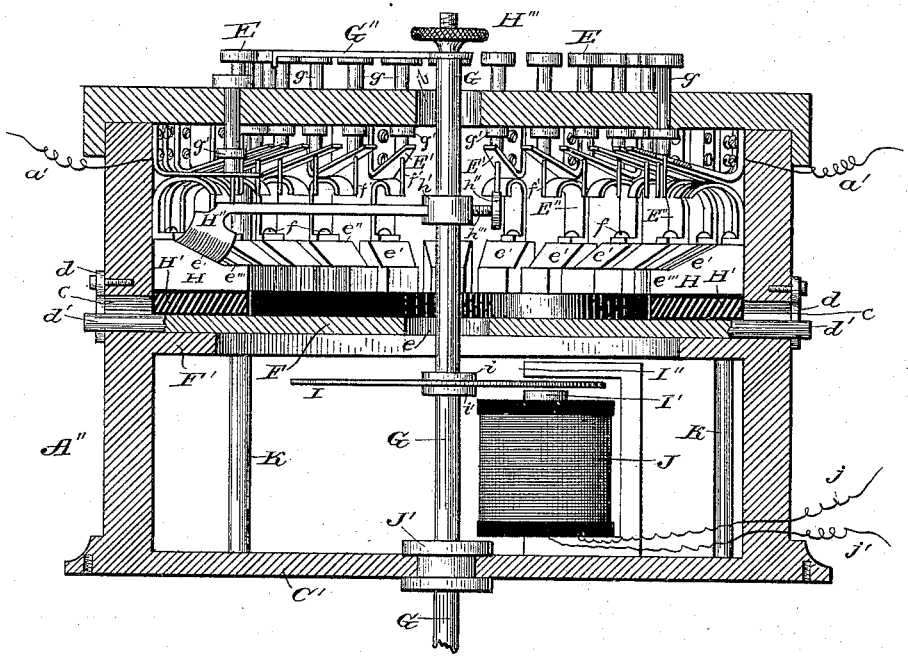

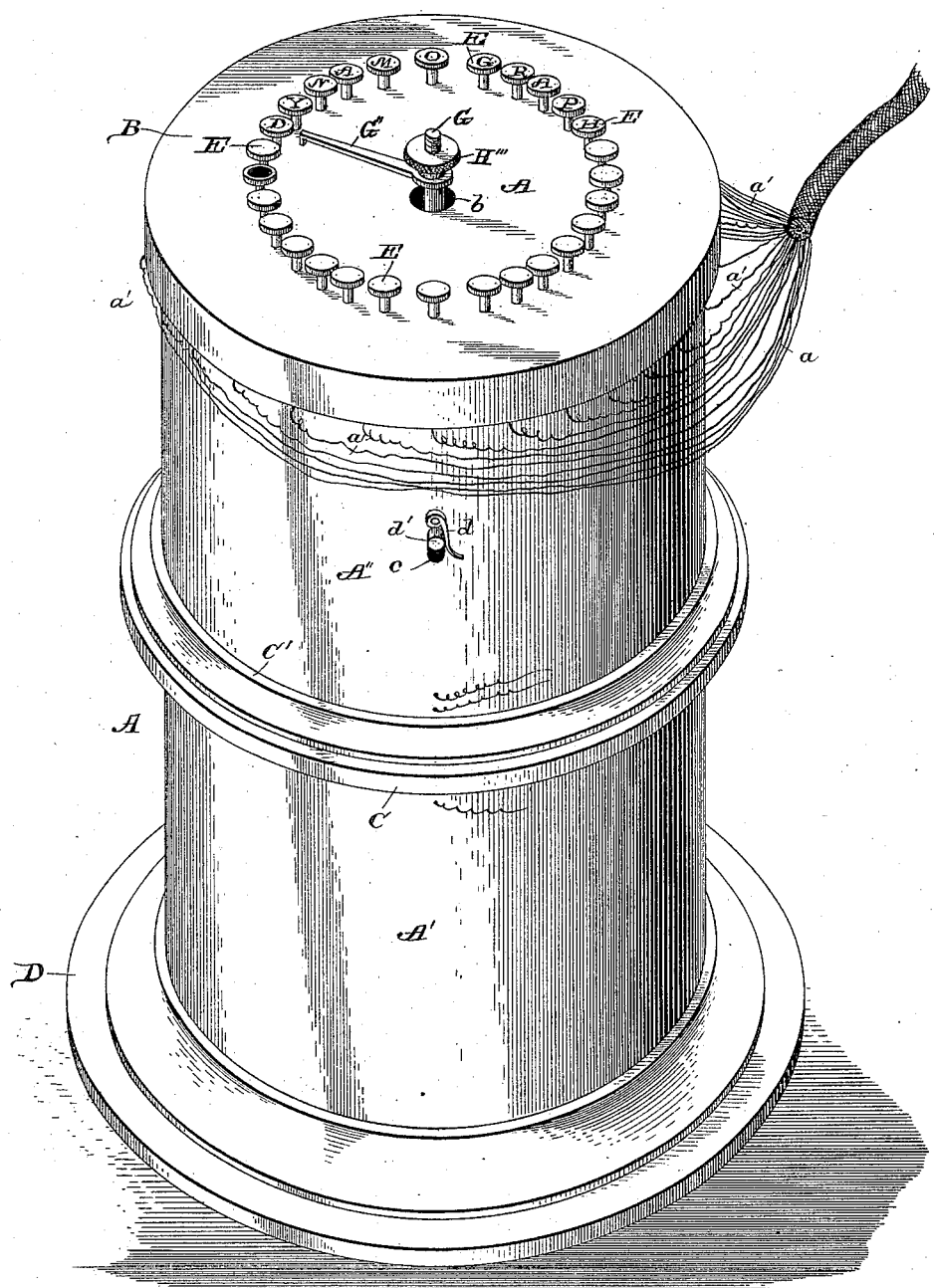

(No Model.) 3 Sheets—Sheet 2.
J. F. McLAUGHLIN.
TRANSMITTER FOR ELECTRICAL TYPE WRITERS.
No. 363,158. Patented May 17, 1887.
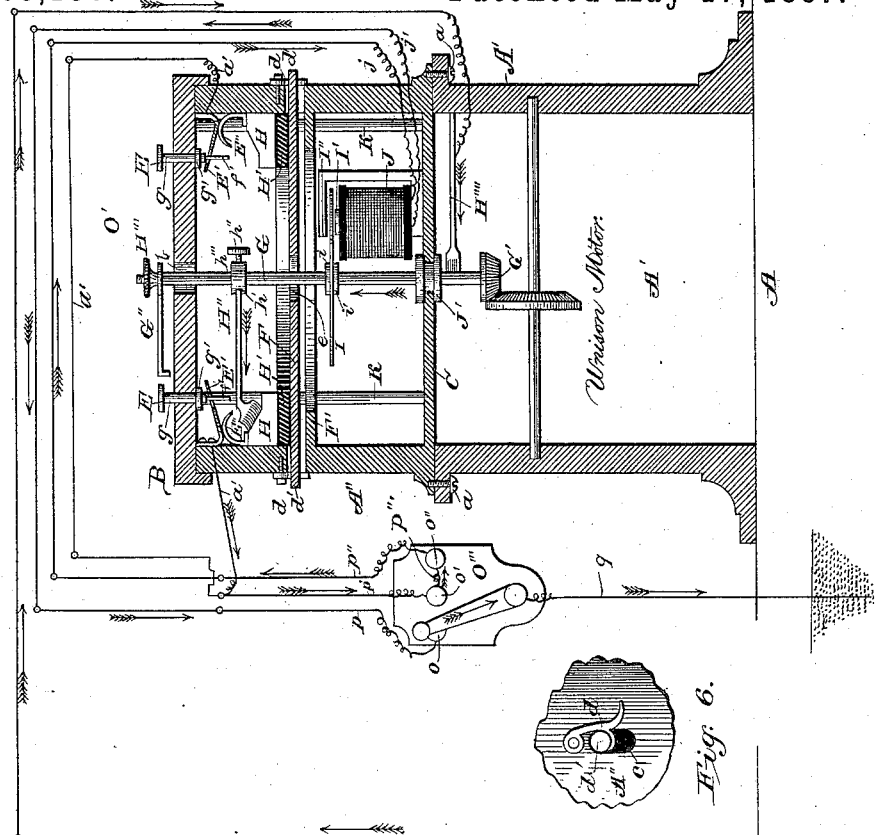
Fig. 5.
Fig. 6.
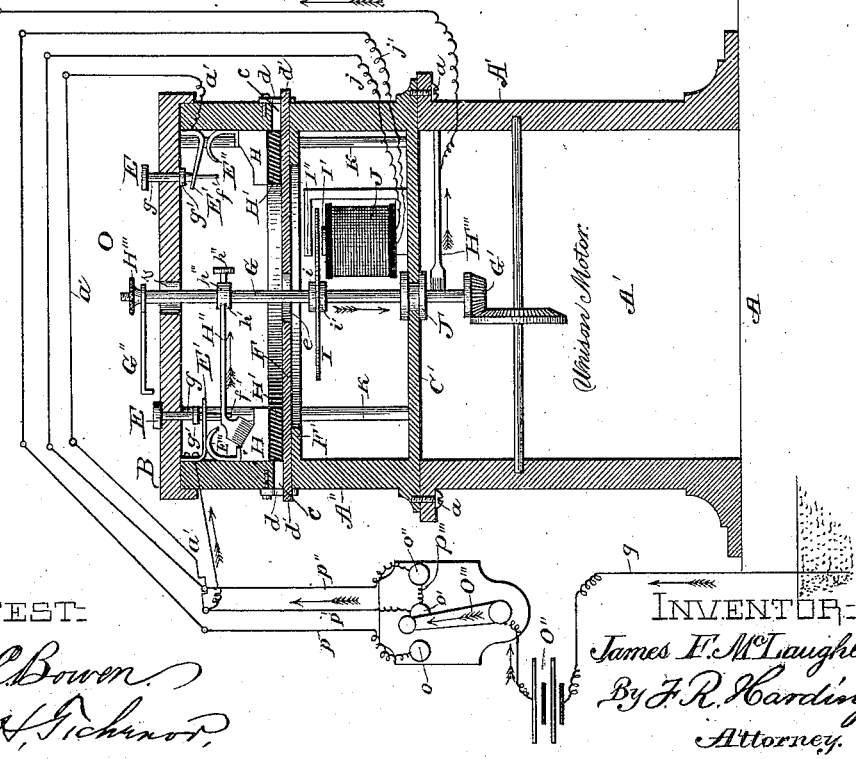
Fig. 2.
ATTEST:
Leroy C. Bowen
Geo. H. Tichenor
INVENTOR:
James F. McLaughlin
By F. R. Harding
Attorney.

(No Model.) 3 Sheets—Sheet 3.

J. F. McLAUGHLIN.
TRANSMITTER FOR ELECTRICAL TYPE WRITERS.

No. 363,158. Patented May 17, 1887.

ATTEST:
Percy C. Bowen
Geo. H. Tichnor

INVENTOR:
James F. McLaughlin
By F. R. Harding
his Attorney.

UNITED STATES PATENT OFFICE.

JAMES F. McLAUGHLIN, OF PHILADELPHIA, PENNSYLVANIA.

TRANSMITTER FOR ELECTRICAL TYPE-WRITERS.

SPECIFICATION forming part of Letters Patent No. 363,158, dated May 17, 1887.

Application filed November 12, 1886. Serial No. 218,698. (No model.)

*To all whom it may concern:*

Be it known that I, JAMES F. MCLAUGHLIN, of Philadelphia, in the county of Philadelphia and State of Pennsylvania, have invented certain new and useful Improvements in Transmitters for Electrical Type-Writers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a reading-telegraph which, although particularly designed for use in conjunction with my improved electrical type-writer, forming the subject-matter of several other separate pending applications, can be independently utilized to synchronously convey or transmit the electrical impulses imparted by the manipulation of the keys of an instrument at one extremity of a main-line circuit to a similar instrument located at the other extremity of line. When this organization of apparatus is used in connection with a printing-telegraph, an electrical type-writer, or, in other words, any suitable receiver which records the message in readable form, each instrument or transmitter at both ends of the line-circuit is suitably electrically connected with such local receiver, so that, by manipulation of the keys of the transmitter at one end of line, the circuit is closed from constant battery, and the electrical impulse imparted synchronously and simultaneously actuates the local receiver, then passes over the line through distant transmitter, which is partly inactive, to its local receiver, and then to ground.

The object of my invention is to furnish an instrument of this class which will be simple and effective in operation, easy of manipulation, durable in use, and capable of being used independently as a reading-telegraph, or, by certain electrical circuit-connections with local receivers, can be adapted to synchronously operate either or both of such latter instruments at different extremities of the line circuit, as may be desired.

My invention embraces the following essential and important features, viz: A series of metallic keys carrying the desired letters or characters are suitably mounted upon a key-board on the top of the cylindrical casing of the instrument, so that the depression or detent of any one of them will cause the contact of one of a series of retracting-springs charged from a conveniently-situated constant battery with another of a series of upwardly-projecting metallic springs connected at their lower ends with a system of circularly-arranged conducting-segments corresponding in number and relative situation to the number of keys of the key-board, thereby closing the circuit from battery and conducting the impulse or current through the segments to a rotating brush-arm rigidly keyed to a central revolving indicator shaft driven by electro-motor and carrying another external parallel arm at its upper end, arranged in line with the brush-arm inside the casing and pointing to the corresponding character of the key-board, as indicated by the contact-brush on the segments. These segments are secured upon the top of a vertically-adjustable cross-bar, which rests upon an under supporting-flange, formed integral with the cylindrical casing, and has two lugs projecting through slots in the sides of said casing, the object of this construction being to allow the segments and their superincumbent springs to be normally put in contact with the retracting-springs actively charged. When the current passes through the inner brush-arm attached to indicator-shaft, it is conducted through said shaft to another stationary contact-brush arm fixed to the side of the casing, and passes on over the line-circuit to the stationary metallic brush-arm of the transmitter located at other end of line, up through central indicator-shaft, along rotating brush-arm, and, the segments and superincumbent springs being raised up against retracting-springs, the current passes through the springs (they all being in contact and the brush rotating in contact therewith) out down to a suitable switch, the contact-lever of which is properly adjusted. Thus the current traverses through said switch and up around the transmitter into an electro-magnet, which is located in proximity to soft-iron disk, also rigidly keyed to indicator-shaft. Said magnet having the converted lower pole brought around in line and above the upper pole, the disk will, in its revolution, rotate through the central line between said poles, and the current, previously described as having energized the magnet, causes the attraction of said disk, thereby stopping the rotation of indicator-shaft with the two parallel arms attached thereto, respectively, at the segment and key corresponding to the key depressed at other end of line. This current then escapes from magnet by a second wire which connects with switch, the lever of which, being properly pointed, allows the current to pass therethrough on to ground; or said current may be utilized to operate the local receiver by suitable switch and wire connections. This movement, as described, is synchronal and under the control of the key of the transmitting apparatus, and each separate letter is indicated by a single pulsation of the electric current of a determinate and uniform length. The motion of the indicator-shaft is arrested when the electro-magnet is in circuit, and the rotating external indicator-arm enables operator to read message, or the same impulse which stops the indicator-arm causes the receiver to record such message. Each key, retracting-spring, contact-spring, and segment corresponds to a letter or character of the key-board, and the release of any of said keys breaks automatically the line-circuit.

This invention consists, further, in certain details of construction, arrangement, and combination of parts, which will be more fully and accurately described hereinafter, and the specific points of novelty in which will be designated in the appended claims.

Figure 5:
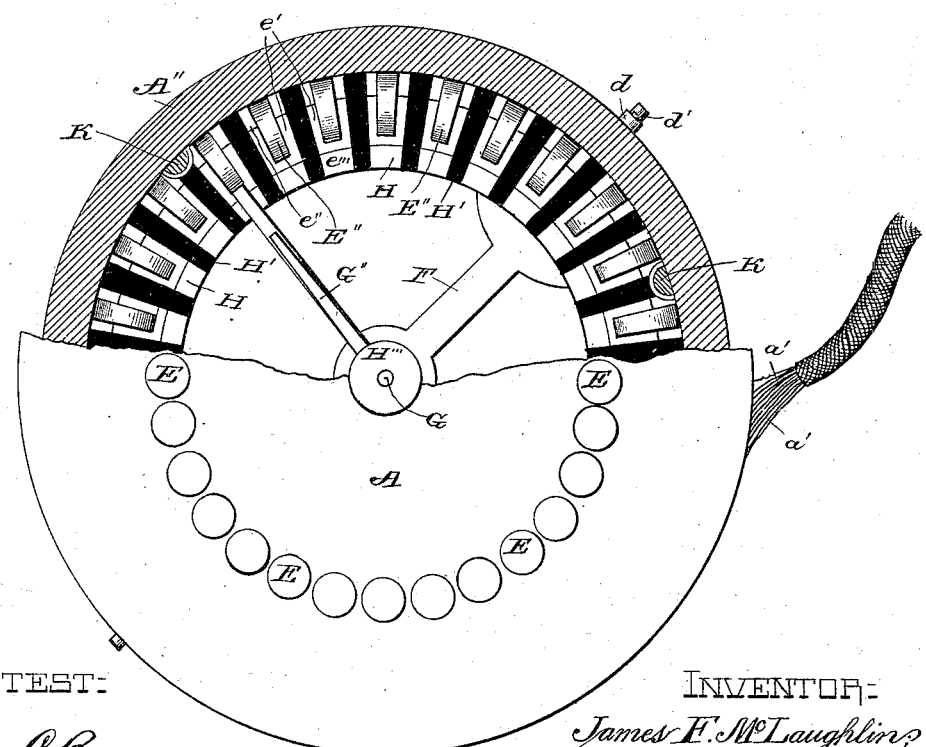

Referring to the accompanying drawings, Figure 1 is a perspective view of the cylindrical inclosing-case for my improved transmitter, showing the upper end of the revolving central shaft, its external indicating-arm, the adjusting-screw therefor, the series of keys arranged in a circular manner upon the removable lid or top and communicating by their stems with the interior, the system of wires piercing the sides of said casing and attached to each and every retracting spring, and the two lugs projecting through a slot in the casing, and their respective catches or clips for holding the lugs at the upper ends of the slots. Figs. 2 and 3 are central vertical sections through two instruments complete, located at different ends of the line-circuit, showing the construction and arrangement of the devices within the cylindrical casing, the gearing and shaft of a suitable motor for driving the central shaft, the switches for cutting the instruments in and out of the circuit, and the line of the circuit shown by arrows from a suitable constant battery to the other instrument at extremity of line. Fig. 4 is a central vertical section, partly in perspective, of one of the transmitters, on an enlarged scale, showing the series of keys on the outside of the top, their stems piercing the ends of retracting-springs, the contact-springs secured to the series of segments corresponding to the number and situation of the keys, the vertically-adjustable cross-bar, the projecting lugs, their catches or clips, the supporting-flange, the slide-bars for the removable segments, the central rotating shaft suitably mounted therein, its two parallel arms, the rotating disk, and electro-magnet for locking said shaft by means of the current received over the line from a separate instrument. Fig. 5 is a top plan view of cylindrical inclosing-casing with parts broken away to show the interior construction. Fig. 6 is a detail view in elevation of one of the projecting lugs of the vertically-adjustable flange and its clip or securing-catch.

Like letters of reference mark the same parts in all the figures of the drawings.

Referring to the drawings by letters, A is a cylindrical casing, designed to hold the interior mechanism, constructed of suitable size and material, made, preferably, of some durable and ornamental wood, having a removable lid, B, suitable base, D, and made centrally separable, as shown in Figs. 2 and 3, the flange or rib C of the lower portion, A', being secured to flange C' of the top portion, A'', by screws $a$ $a$. The lower portion of this casing is designed to hold the electromotor and gearing for driving the central shaft, and the top portion is the receptacle for the devices shown in Fig. 4.

The lid or top B is provided with a series of small peripheral or circularly-arranged apertures corresponding to the number of keys intended to be used. In these holes or apertures are inserted the stems of the series of keys E E, (shown in Fig. 1,) the said apertures being sufficiently large to allow of a vertical play or movement of the keys. Centrally in this lid B is formed a circular opening, $b$, through which projects the central shaft, G.

It will be understood that the apertures formed in the top of the casing are of just a sufficient distance from the circular opening $b$ to admit of the free rotary movement of the indicator-arm attached to the projecting end of the central shaft without impinging against the keys E E, carrying the desired letters or characters.

Immediately below the flange of the lid B are a circular row of small holes corresponding in number and location to the number of retracting-springs of the keys E E. Through each of said holes is passed one of the small wires $a'$ $a'$, connecting at one end to the line of the battery and at the other is secured to one of the retracting-springs E'. (See Figs. 2 and 3.)

$c$ $c$ designate two slots of suitable length and shape cut through the sides of the portion A'' of the casing, which serve as supports for the ends of the lugs of a vertically-adjustable cross-bar, F, resting in its normal position on the supporting flange or lip F', formed on the inside of casing A, and secured when raised by the pivoted clips $d$ $d$ on the outside of casing, which clips engage and hold the projecting lugs $d'$ $d'$ of said flange, as shown clearly in Figs. 2, 3, and 4. This cross-bar F is also provided with a circular opening, $e$, through which the shaft G extends.

H H H are a series of metallic conducting-segments of the form shown, having the line or surface $e'$ inclined and running from the upper plane, $e''$, to the lower parallel plane, $e'''$, the object of this construction being to present an inclined contact-surface which will be free from dust, &c. These segments are of suitable number, corresponding to the number of keys E E, and arranged and secured in circular order upon a suitable hard-rubber ring or base, H'. Each segment is insulated from the next adjacent segment, the space between each being filled with an inexpensive and durable insulating material. (Not shown.) Upon the plane $e''$ of each of said segments H H is fastened by a screw, $f$, one of the metallic davit-shaped contact-springs E"E'", which extends upwardly to within a distance, determined by the length of the slots $c$ $c$, of one of the retracting springs E' E'. Thus it will be obvious that when the cross-bar F is elevated and fastened at the top of slots $c$ $c$ by clips $d$ $d$ the springs E" E" will be normally in contact with springs E' E'. The springs E' E' are of conducting metal of great elasticity and of the form shown, and are each secured directly above its respective contact-springs E", by suitable screws or rivets, to the casing A, which, as before stated, is of non-conducting material. Near the forward ends of each of said springs E' is a small eye, through which passes the rod $f'$ of the stem $g$ of key E. Each of the keys E E consists of a circular top or button, the stem $g$, the collar $g'$, formed near the lower end, and the rod $f'$, loosely passing through an eye in its respective retracting-spring, and of the required length to engage and intercept the rotation of the brush-arm H" when its respective key is depressed. This construction of key is designed both to allow its retracting-spring to return it to an upright position after it has been once depressed, the collar $g'$ preventing it from being retracted too far, and at the same time admits of the removal of the lid B, the rods $f'$ all slipping easily from the eyes in their respective springs E'. The vertical shaft G is made of suitable conducting metal, provided at its lower end with a small bevel-gear, G', and formed at its upper end with screw-threads and shoulder, as shown in Fig. 4.

G" indicates the external indicating-arm provided at its inner end with a screw-threaded perforation, (not shown,) through which is passed the screw-threaded end of vertical shaft G, this arm being jammed tightly up against the shoulder of shaft by a nut, H'".

H" is the interior brush-arm, which is rigidly secured on the same side of shaft G and parallel with arm G" by means of a collar, $h'$, and a jam-nut, $h''$, fitting on the rearwardly-projecting screw $h'''$. Thus the two arms G" and H" are kept exactly and rigidly parallel with each other, one indicating the letter or key of the key-board and the other its corresponding segment. Should those arms inadvertently get out of line they can be removed and properly readjusted by the jam-nuts H'" and $h''$, as before described.

H"" is a stationary brush-arm secured at one end to the portion A' of the casing and provided at other end with a metallic brush, which is constantly in contact with shaft G.

I designates a thin soft metal disk or armature mounted in between the collars $i$ $i'$ of the shaft G just below the flange F', and when the shaft is rotated revolves centrally in the magnetic field of the poles I' I" of the electro-magnet J. The shaft G, carrying the arms G" H" and the disk I, is suitably journaled by a thimble or collar, J', in a perforation in the flange C' of the casing, and may be kept in more exact vertical line by a suitable bracket and step (not shown) situated at its lower extremity.

The magnet J is of the ordinary construction, secured on flange C and having the pole I", converted as shown, brought around the side and parallel to the height of the said magnet up directly above the pole I' thereof. Thus when the disk I is revolving and the magnet is in circuit it passes centrally in the magnetic field of the poles I' and I", and is mutually attracted by both of said poles, thereby stopping the rotation of shaft G, the object of which will be understood hereinafter.

The magnet J of instrument O' is energized by the current which has passed through instrument O over line P' and through the instrument O' in converse order, and then along wires $a'$ and $p'$, switch-point $o'$, short wire $p'''$, point $o''$, and wires $p''$ and $j$ of Fig. 3. The magnet being de-energized by the release of the respective key depressed, the circuit is completed, the path $j'$ being connected with ground by wire $p$ and switch, as clearly explained in the operation hereinafter. Thus it will be understood that the magnet J is in circuit in but one instrument, that being the receiving-instrument. Conversely, if the magnet J of instrument O were in circuit the position of the parts of instrument O would have to be arranged similar to those of instrument O', as shown in Fig. 3, and the arrangement of parts of instrument O' would then necessarily occupy similar positions to those of instrument O. (Shown in Fig. 2.) Therefore it will be obvious from the preceding and the explanation of the operation hereinafter that the instruments illustrated in Figs. 2 and 3 are, when used independently as reading-telegraphs, capable of being used alternately as transmitters and receivers.

K K K are three vertical slide rods or guides secured on the inside of casing A, and substantially semicircular in cross-section, two of which are shown in Fig. 5. They fit in the semicircular recesses on the sides of the segments to prevent the rotary movement of the central shaft, G, from dislodging or displacing the relative positions of the said segments.

In Figs. 2 and 3, as before stated, are placed two of my instruments, each of the construction hereinbefore described, and situated, respectively, at each end of the line, as shown, the instruments being designed for use independently and alternately as reading-telegraphs, the instrument O, as illustrated, being a local transmitter, and O' serving, substantially, as a receiver at extremity of line-circuit.

Now, to preclude the possibility of any error or misunderstanding, we will suppose that the operator desires to manipulate the keys of the local transmitter O to send a message over the line-circuit to the instrument O', located at the other end thereof.

O'' designates any suitable constant battery connected by wire to the pivoted switch-lever O''' and $o$, $o'$, and $o''$ are three points of the switch P.

$p$ is a suitable insulated wire connecting the point $o$ with wire $j'$ of magnet J.

$p'$ is a similar wire connecting at one end to point $o'$ and at the other to the series of wires $a'$ $a'$ of the retracting-springs E'. These wires may be, for convenience, arranged in the manner shown in Figs. 2, 3, and 5, which illustrate the lead-wires $a'$ $a'$, converging in a suitable cable at the side of the casing A and suitably connected to wire $p'$.

$p''$ is a wire secured at one end to point $o''$ and the other end to magnet J.

$p'''$ is a short wire connecting points $o'$ $o''$.

P' is the line-wire connecting the two stationary brush-arms H'''' at each end of the line.

$q$ is a wire connecting the battery $o''$ with ground, and $q'$ a wire connecting switch-lever O''' at other end with ground, as shown in Fig. 3.

It will be understood that these circuits and connections, as above explained, are used merely when the transmitters are used independently as a reading-telegraph. When the transmitters are used in conjunction with their respective local receivers, the location of battery-switches, cut-outs, electrical connections, &c., are differently arranged and operated. However, such arrangement will not be described or claimed herein, as such appurtenances, together with an improved receiver or electrical type-writer, will form subject-matter of another application.

The operation of my invention is as follows: When operator at transmitter O desires to send message to operator at receiving-instrument O', the switch-lever O''' of instrument O is first pointed to post $o'$, which allows current from battery to flow up through wires $p'$ and $a'$ $a'$ to all of the retracting-springs E' E'. Then operator at instrument O' elevates and secures the lugs of the cross-bars F to height of slots $c$ $c$ by catches $d$ $d$, thereby placing the springs E'' normally in contact with retracting-springs E', as shown in Fig. 3, and points switch-lever O''' to point $o$. Then the instruments are in proper position to perform their respective work. The operator at O now successively and respectively depresses the keys E E, which carry the desired letters, characters, and punctuation which compose the message. Suppose, for instance, that the key shown depressed in Fig. 2 is the first one touched by operator. Then, as shown, it causes the contact of one of the retracting-springs E' with a spring, E'', closes the circuit from battery O'' through switch-lever O''', point $o'$, wire $p'$, and wire $a'$, stops the rotation of arm H'', as explained hereinafter, and is returned to its normal raised position by virtue of the retracting agency of spring E' when pressure of finger is released. Now, the circuit, as before stated, being closed, the current passes through spring E'' to the corresponding segment H, the brush-arm H'' being arrested in its rotation by the rod $f'$ of the particular key depressed opposite to the segment corresponding to said key, and the said current is communicated by this particular segment H which corresponds to the key depressed to the said rotating-arm H'', on through shaft G to stationary contact-brush arm H'''', and then over the line P', as shown by arrows in Figs. 2 and 3, down to the other stationary contact-brush arm, H'''', of instrument O' at extremity of line. Now, the vertically-adjustable cross-bar F being raised and secured in the slots, putting springs E' E'' of instrument O' in contact, the current previously described as having entered the brush-arm H'''' is conducted up through central shaft, G, across arm H'', to segment H, springs E'' and E', through wires $a'$ $b'$ to point $o'$, then through short wire to point $o''$, up through wire $p''$ in the direction of arrows, around through wire $j$ to magnet J, to ground through wire $j'$, energizing said magnet to attract and stop rotation of disk-armature I, thereby stopping revolution of shaft G, with its arms H'' and G'', respectively, at the key and segment of instrument O', that corresponds to the first key depressed in Fig. 2, and finally passes to ground by the electrical connections described hereinafter. The magnet is de-energized by release of the finger-pressure upon the respective key depressed, and the shaft is allowed to again rotate, the wire $j'$ conducting the escaping current over to wire $p$, point $o$, through switch-lever O''', to wire $q'$, to ground; or said current may be by certain electrical connections and switches (not shown in this application, as aforesaid) utilized to actuate any suitable receiver connected with the instrument O'. Thus the operation is continued until the desired message is completely transmitted.

It will be understood that by reversing the arrangement of switches P P and the vertically-adjustable cross-bars F F the instrument O' can be used to similarly transmit over line to transmitter O.

Again, it will be obvious that, in the event of the instruments hereinbefore described being either used independently or in connection with receivers, by means of a suitable intermediate switch-station, they may be located and operated one at any number of extremities of a line-circuit, and can be readily, easily, or separately connected with each other, so as to transmit to any number of points as may be desired. Furthermore, the key shown black in Fig. 1 is designed to be used as a blank or spacing key, both when this invention is used independently or in conjunction with receivers.

The arrangement of the battery, electrical connections, switches, &c., can be suitably and conveniently changed to meet requirements, provided the depression of any one of the keys closes the circuit from battery or magneto-generator and arrests the rotation of the indicator-shafts, and consequently their trailing arms, in the manner before described.

Having thus fully described my invention, what I claim, and desire to secure by Letters Patent of the United States, is—

1. The combination of two instruments respectively located each at an extremity of a line-circuit, as shown, and consisting each, essentially, of a series of circuit-closing keys having elongated stems which engage and intercept the rotation of a revolving contact-brush arm when a key is depressed, a series of normally-charged retracting-springs corresponding in number and relative situation to the series of keys and adapted to make contact with a series of vertically-adjustable segments, a series of segments arranged to be normally in or out of contact with the retracting-springs and corresponding in number and relative situation thereto, a central shaft revolving in unison with the shaft of the other instrument and provided, respectively, with an exterior indicating-arm, an interior brush-arm normally in contact with the segments, and an armature-disk mounted rigidly upon the said central shaft and projecting in the center of the magnetic field of an electro-magnet, an electro-magnet in circuit with the source of electricity at the other end of the line, and a suitable device, as shown, for electrically connecting the rotating shaft with the line-circuit, the whole being arranged to operate as set forth, with two sources of electricity, respectively, at each end of the line, the switches, and the electrical connections whereby the successive and separate electric pulsations transmitted from either extremity of the line-circuit are received and indicated at the other extremity, as specified.

2. The combination of a suitable source of electricity, the retracting-springs, the wires connecting each of said springs with the switch, a three-point switch having its lever in circuit with the battery and one of its points in circuit with all of the retracting-springs, and the circuit-closing keys provided each with an elongated stem, as specified.

3. The combination of the series of keys, each having inwardly-projecting stem provided with collar and extension-rod, the retracting-springs having the forward ends provided with eyes for reception of the extension-rods of the keys, and the contact-springs arranged below said retracting-springs, corresponding in number and relative situation thereto, as set forth.

4. The combination of the keys, retracting-springs, and contact-springs, arranged and constructed as described, with the system of circularly-arranged insulated segments corresponding in number to the keys and each having one of the contact-springs secured thereto, as set forth.

5. The combination of the series of insulated segments arranged as shown and their superincumbent springs with the vertically-adjustable cross-bar, whereby the segments and contact-springs may be elevated, and said contact-springs placed normally in contact with retracting-springs, substantially as set forth.

6. The combination of the centrally-separable cylindrical inclosing-case having the slots and pivoted catches on the sides thereof, as shown, the vertically-adjustable cross-bar supporting the series of segments, provided with end lugs which project through said slots, and the inner circular flange formed integral with the casing and supporting the cross-bar supporting the said series of magnets in its normal position, as described.

7. The combination of the circuit-closing keys, the retracting-springs, and the vertically-adjustable contact-springs and insulated segments with the central revolving shaft provided, respectively, with external indicating-arm and the internal contact-brush arm, both adjustably mounted on said central shaft, substantially as described.

8. The combination of the vertically-adjustable segments and contact-springs with the central revolving shaft and the rotating brush-arm mounted thereon and adapted to rotate in contact with said segments, substantially as set forth.

9. The combination of the series of keys mounted in the removable lid of the cylindrical casing and having the stems, as shown, provided with collars, and extension-rods piercing the ends of the retracting-springs and of sufficient length to intercept the rotation of inner contact brush-arm when a key is depressed with the retracting-springs, the vertically-adjustable insulated segments carrying contact-springs, and the inner brush-arm mounted rigidly on the central rotating shaft, substantially as shown and described.

10. The combination of the vertically-adjustable segments and their respective superincumbent springs with the retracting-springs, the series of keys having stems and collars, as shown, and provided with extension-rods piercing ends of retracting-springs and of sufficient length to intercept the rotation of the inner brush-arm when a key is depressed, the external indicating-arm mounted adjustably on upper end of central shaft, and the inner rotating contact-brush arm, substantially as shown and set forth.

11. The combination of the series of circuit-closing keys suitably mounted in removable lid or top of cylindrical casing and having the stems and collars, as shown, and provided with extension-rods piercing the ends of retracting-springs and of sufficient length to intercept the rotation of inner rotating brush-arm adjustably mounted on the central revolving shaft, as set forth.

12. The means, such as described, for rendering the segments and their superincumbent springs vertically adjustable, which consists of the cross-bar supporting said segments, provided with end lugs which project through slots of the required size in sides of casing, and the pivoted thumb-catches for holding said lugs at the upper end of said slots, as described.

13. The combination of the revolving central shaft, the casing, the keys having elongated stems provided with collars, as shown, the external indicating-arm, and the inner rotating contact-brush arm, as set forth.

14. The combination of the central rotating shaft with the armature-disk rigidly keyed thereon and revolving centrally in its rotation between the poles of a magnet, the electro-magnet secured upon the diaphragm of the casing and having the poles thereof arranged in line and in proximity to each other, and a suitable source of electricity and electrical connections for energizing and de-energizing said magnet, as set forth.

15. The contact-segments, such as shown and described, each formed of suitable conducting material insulated from the adjacent segments and having an inclined contact-surface, as shown, said segments being arranged relatively with reference to their respective keys in circular order upon a vertically-adjustable flange, in combination with the vertically-adjustable supporting cross-bar, the retracting-springs, the circuit-closing keys, and the circuit, as shown and described.

16. The combination of the circuit-closing keys and their respective retracting and contact springs and the vertically-adjustable segments with a suitable constant battery separately connected with each and every retracting-spring, as set forth.

17. The combination of a constant battery with the wires $a'\ a'$, arranged as described, the switches P P, and the retracting-springs and keys for closing the circuit, as set forth.

18. The combination of the vertically-adjustable cross-bar, the superincumbent segments, and the casing, as described, with the vertical guide-rods, whereby such mechanism is retained in its proper position, as set forth.

19. The combination of the battery, switch, and the wires connecting each retracting-spring with the line from battery with the circuit-closing keys, the retracting and contact springs, and the vertically-adjustable segments, as described.

20. The combination of the vertical rotating shaft, the external indicating-arm, the inner brush-arm, and the armature-disk with the means, such as shown and described, for stopping the rotation of said shaft by the depression of any of the circuit-closing keys of the key-board, with its respective arms at the respective segments, and the key corresponding to the key depressed, and the electro-magnet having poles arranged as shown and set forth.

21. The combination of the vertically-adjustable segments, the contact and retracting springs, and the circuit-closing keys with the central revolving shaft, the contact and indicating arms, the armature-disk, the electro-magnet having the poles arranged as shown, the stationary brush-arm fixed to casing and normally in contact with lower end of central shaft, the line-circuit, the switches, electrical connections, and a suitable battery, as set forth.

22. The combination of the central vertical revolving shaft, the collars $i\ i'$, and the disk-armature I', adapted to be attracted by a suitable electro-magnet having electrical connections, the stationary brush-arm connecting the central shaft with the line, and the line-circuit, whereby said shaft is stopped and released at the desired time, as set forth.

23. The combination of the shaft G and arms H'' and G'' with the segments H H and keys E E, the battery, and the line-circuit, as set forth.

24. The combination of the keys, each having a stem, $g$, collar $g'$, and rod $f'$, of the necessary length, with the arm H'', secured to shaft G, and the rotating central shaft, the retracting-spring, the vertically-adjustable segments, and the circuit, as set forth.

25. The combination of the battery O'', the switch-lever O''', points $o\ o'\ o''$, and wires $p\ p'\ p''$ and $a'\ a'$, with the retracting-springs E' and the keys E E, as shown and described.

26. The combination of a suitable constant battery having switch, switch-points, switch-lever, and suitable wire-connections with retracting-springs with the circuit-closing keys, the retracting-springs, contact-springs, insulated segments, contact-brush arm, external indicating-arm connecting the central shaft with the line, the central vertical rotating shaft, the stationary brush-arm, and the line-circuit, as set forth.

27. The combination of the vertically-adjustable segments adapted to receive the current communicated by the contact and retracting springs through depression of the keys of the instrument with the rotating contact-brush arm, the revolving central shaft, the stationary brush-arm, and the line, as set forth.

28. The combination of the vertically-adjustable segments adapted to receive current from retracting-springs through their respective contact-springs communicated by the depression of the keys of the instrument with the external indicating-arm, the rotary contact-brush arm, the vertical central revolving shaft, the stationary brush-arm, the line, the armature-disk, and the electro-magnet having poles arranged as shown and described.

29. The combination of the electro-magnet J, having poles I' I'' and suitable line and ground connections, with the armature-disk I, mounted on a central revolving shaft, the central rotating shaft provided with the arm G'', and the circuit-closing key-board, as set forth.

30. The combination of the electro-magnet J, having poles I' I'', arranged as shown, with the disk-armature I and shaft G, the arm G'', the keys E E, the wires $j\ j'$, and the circuit and connections, as set forth.

31. The combination of the electro-magnet J, having poles I' I'', as shown, the disk-armature I, the shaft G, the arms G'' and H'', and the circuit and connections, as set forth.

32. The combination of the electro-magnet J, having the poles I' I'', as shown, the disk-armature I, the shaft G, carrying said disk-armature, the arms G'' and H'', the vertically-adjustable segments, the contact-springs, the retracting-springs, the keys E E, the wires $a'$ $a'$, the circuit, connections therefor, and the switch, as set forth.

33. The combination of the shaft G, carrying disk I, and arms G'' and H'', rigidly keyed thereon, with a suitable gearing mounted upon the shaft of a motor for rotating said shaft, as set forth.

In testimony that I claim the foregoing as my own I affix my signature in presence of two witnesses.

JAMES F. McLAUGHLIN.

Witnesses:
    JULIUS SOLGER,
    CHAS. M. WERLE.